United States Patent [19]
Soroushian et al.

[11] Patent Number: 5,973,758
[45] Date of Patent: Oct. 26, 1999

[54] VIDEO SYNCHRONIZATION

[75] Inventors: Kourosh Soroushian, Sunnyvale; Feng-Ming Wang, Milpitas; Siok Huang Tay, Cupertino, all of Calif.

[73] Assignee: C-Cube Microsystems, Inc., Milpitas, Calif.

[21] Appl. No.: 09/006,761

[22] Filed: Jan. 14, 1998

[51] Int. Cl.$^6$ ...................................................... H04N 7/26
[52] U.S. Cl. .................... 348/845.2; 348/512; 348/845.3
[58] Field of Search ............................. 348/845.2, 845.3, 348/423, 512; H04N 7/26

[56] References Cited

U.S. PATENT DOCUMENTS

| | | | |
|---|---|---|---|
| 5,519,546 | 5/1996 | Lewis | 360/48 |
| 5,818,539 | 10/1998 | Naimpally | 348/512 |
| 5,828,414 | 10/1998 | Perkins | 348/423 |
| 5,847,779 | 12/1998 | Acampora | 348/845.3 |

*Primary Examiner*—Howard Britton
*Attorney, Agent, or Firm*—Proskauer Rose LLP

[57] ABSTRACT

An encoder system includes an internal counter (PTS or presentation time stamp counter). The counter provides information which enables the encoder system to resynchronize itself in the event synchronization with the video input stream is lost. Preferably, the counter is implemented in software. The encoder system also include a comparator (preferably implemented in software). The comparator is able to determine if particular regions of the input video stream have been captured at an expected time according to the internal counter within a predetermined error window by comparing the actual capture time with the expected capture time. In general, if the encoder system is synchronized with the incoming video stream, each successive blanking or active region will be captured at its expected time according to the internal counter within a predetermined error window. In this event, the timing of the various modules of the encoder system (e.g., preprocessing, spatial encoding, etc.) is based on the actual timing of the capture of a particular region according to the internal counter. In the event synchronization is lost between the video input stream and the encoder system, the encoder system resynchronizes itself with the video stream. Further, encoding of previous successively captured regions is based on the expected capture time (rather than the actual capture time) until a predetermined number (e.g., four) of regions are captured at the expected time within the error window.

8 Claims, 4 Drawing Sheets

VIDEO SYNCHRONIZATION

FIELD OF THE INVENTION

The present invention relates to a method for encoding digital video signals. In particular, the present invention relates to the synchronization of an encoder system with an incoming digital video signal.

BACKGROUND OF THE INVENTION

MPEG-2 is now the most widely accepted standard for the transmission and/or storage of compressed digital video signals. More particularly, the MPEG-2 standard specifies a syntax (i.e., bitstream format) for a compressed digital video stream and a semantic (decoder algorithm) for decoding the MPEG-2 bitstream. The MPEG-2standard leaves to the individual user the design of an encoder system which encodes an uncompressed digital video stream to generate a compressed MPEG-2 bitstream.

The video signal which is input into an MPEG-2 encoding system comprises a sequence of frames. The frames may be progressive or interlaced. An interlaced frame picture comprises odd and even field pictures.

FIG. 1 schematically illustrates the format of one type of video stream which is inputted into a video encoder system. More specifically, FIG. 1 illustrates the CCIR 656 (or D1) format. Each frame comprises four successive regions, namely (1) odd blanking region, (2) odd active region, (3) even blanking region, and (4) even active region. The blanking regions contain lines in the vertical blanking interval and the active regions contain lines in the active video interval of the CCIR 656 or D1 formats. The number of pixels per line will vary depending on specific encoding features.

In general, an MPEG-2 encoder system includes a preprocessor and an encoder. The preprocessor performs a variety of functions to place the sequence of video frames into a format in which the frames can be compressed by the encoder. For example, in the case where the video source is a telecine machine which outputs 30 interlaced frames per second, the preprocessor converts the signal into 24 frames per second for compression in the encoder by detecting and eliminating duplicate fields produced by the telecine machine. In addition, the preprocessor may spatially scale each picture of the source video so that it has a format which meets the parameter ranges specified by the encoder.

The video encoder is preferably an encoder which utilizes a video compression algorithm to provide an MPEG-2 compatible bit stream. The MPEG-2 bit stream has six layers of syntax. There are a sequence layer (random access unit, context), Group of Pictures layer (random access unit, video coding), picture layer (primary coding layer), slice layer (resynchronization unit), macroblock layer (motion compensation unit), and block layer (DCT unit). A group of pictures (GOP) is a set of frames which starts with an I-picture and includes a certain number of P and B pictures. The number of pictures in a GOP may be fixed. A slice is a group of consecutive 16×16 macroblocks.

The first step in a real time encoder system is capturing an incoming digital video stream. The capturing of the incoming digital video stream constitutes an important link between the encoder system and the outside environment. In general, the video stream is the main point upon which all of the encoding system's modules are synchronized. As the incoming video stream is not immune to noise and other types of corruption, in the event of a bad video stream, the encoder system must be able to continue its function and more importantly resynchronize its internal modules with the video stream once the video stream has regained coherency.

A corrupt video signal can be divided into two main categories: the first category is one where the video signal's synchronization points are still detectable, but are not coming at the expected times. This abnormality is mostly due to the presence of noise on the input signal, or the incoherency of the video source itself.

The second major problem category is when the video signal is completely lost, where the encoder has lost its reference to the video stream and must operate without a major synchronization point. This case normally occurs when the video source is disconnected from the encoder system. It may also occur in some video storage formats where during the rewind of video the synchronization signals become unavailable. In both cases of corrupt video streams, however, the encoding system must be able to continue its functionality, and be able to resynchronize itself to the video once the input video stream has stabilized.

It is an object of the invention to provide a synchronization method for a video encoding system which enables the encoding system to resynchronize itself to a video input stream once the video input stream has stabilized following a corruption event.

SUMMARY OF THE INVENTION

As indicated above, an input video signal comprises frames, each of which includes four main capture regions: (1) odd blanking, (2) odd active, (3) even blanking, (4) even active. The active regions contain uncompressed digital video data to be encoded.

In accordance with an illustrative embodiment of the present invention, the encoder system includes an internal counter (PTS or presentation time stamp counter). As is explained below, the counter provides information which enables the encoder system to resynchronize itself in the event synchronization with the video input stream is lost. Preferably, the counter is implemented in software. The encoder system also include a comparator (also preferably implemented in software). The comparator is able to determine if particular regions of the input video stream have been captured at an expected time according to the internal counter within a predetermined error window by comparing the actual capture time with the expected capture time. In general, if the encoder system is synchronized with the incoming video stream, each successive blanking or active region will be captured at its expected time according to the internal counter within a predetermined error window.

In this event, the timing of the various modules of the encoder system (e.g., preprocessing, spatial encoding, etc.) is based on the actual timing of the capture of a particular region according to the internal counter.

In the event synchronization is lost between the video input stream and the encoder system, the encoder system resynchronizes itself with the video stream. The first case is where the video input stream is not lost, but rather, the comparator indicates that capture of a region does not take place at the expected time according to the internal counter within the predetermined error window. In this case, the timing of the various modules in the encoder system is based on the expected capture time according to the internal counter, rather than the actual capture time. Encoding of previous successively captured regions is based on the expected capture time (rather than the actual capture time)

until a predetermined number (e.g., four) of consecutive regions are captured at the expected time within the error window. When this occurs, timing of the encoding system returns to being based on the actual capture time.

The second case is where the video input stream is lost. In this case, the encoder system continues its function by encoding video frames previously captured and now in its internal memory. The coding of these frames is based on expected timing. When the video input stream resumes, the video encoder system resumes encoding based on actual capture time after a predetermined number of consecutive regions are captured at their expected time according to the internal counter within a window of error. When this occurs, the internal pipeline of the encoder system delays itself to align itself with the end of a valid active video region.

DETAILED DESCRIPTION OF THE INVENTION

Figure 2:
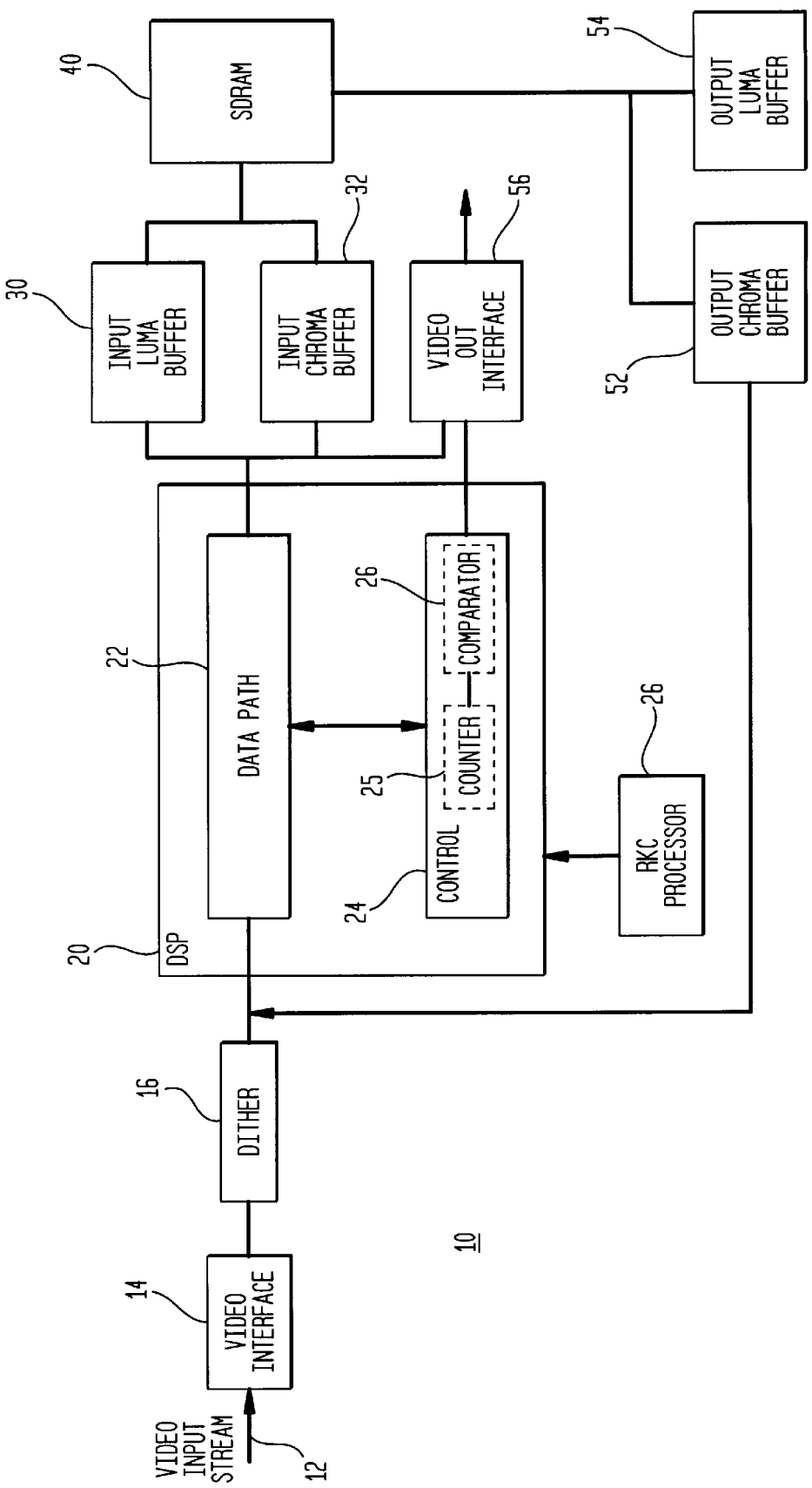
FIG. 2 schematically illustrates a video encoder system which schematically is able to resynchronize in accordance with an illustrative embodiment of the invention.

FIG. 2 schematically illustrates a video encoding system 10, especially the part of the encoding system involved in the capture of an incoming uncompressed digital video bit stream. The input to the system 10 is a digital video bit stream 12. Illustratively, the input stream comes from a digital tape media in the CCIR 656 (parallel D1) format or comes from a low cost decoder chip, such as the Philips SAA 7111 or Brooktree bt 819. It should be noted that several of the systems 10 may be utilized in parallel for different portions of an input video signal. The input video streams have eight bits per pixel or ten bits per pixel.

The input video stream enters the encoder system 10 via the video interface 14. If the input is 10-bit video, it is dithered down to 8-bit video by the dithering circuit 16.

The encoder system 10 includes a digital signal processor (DSP) 20. The DSP 20 includes a data path 22 and a controller 24. The data path 22 comprises a 8-tap/8-phase horizontal filter. During a capture process, this filter is used for resampling and noise reduction of the video to be captured. The DSP also includes a controller processor 24. High level control of the DSP is accomplished by an external RISC processor 16. The DSP can be programmed to perform a variety of functions, including scaling, spatial encoding, spatial decoding, compositing of two pictures, etc. The luma and chroma pixels processed by the DSP are buffered in the input luma buffer 30 and the chroma buffer 32. These buffers illustratively have a capacity of 128 bytes. The luma and chroma pixels are then stored separately in the SDRAM (synchronous DRAM) 40.

To process these pixels further, they are removed from the SDRAM 40 and buffered in the output chroma buffer 52 and output luma buffer 54. The pixels are then passed again through the DSP 20 for further processing. The pixels may follow the path of DSP 20, input buffers 30, 32, SRAM 40, and output buffers 52, 54 for multiple passes through the DSP. The video is finally output via the video output interface 56. Depending on how much processing is done by the DSP, the pixels may output to an encoder chip such as the SAA 7125 or the BT 856.

The present invention is directed to maintaining the synchronization between the input video bitstream and the encoder system 10. For this purpose, the DSP controller 24 includes a counter 25 and a comparator 26. Preferably, the counter 25 and comparator 26 are implemented in software, although this is not necessarily the case. The input video stream 12 is generally synchronous in that the blanking regions and the active regions follow each other at expected intervals. When the input video stream is synchronized with the encoder system, the capture of each region of the input video stream is completed at an expected time according to the counter 25 within a predetermined error window.

There are certain bits in the input video stream which delineate the various regions. Thus, a signal may be provided from the data path 22 to comparator 26 indicating when capture of a region is complete. The comparator 26 can then compare an expected time of capture with an actual time of capture as indicated by the internal counter 25. In general, if the input video stream and the encoder system are synchronized, the capture of a particular region of the input video stream will take place at the expected time within a predetermined error window. In this case, the operation of the encoder system with respect to encoding a particular captured region is based on the actual time of capture. An indication of this is provided by the controller 24 to the data path 22 and to other modules of the encoder system.

Figure 3:
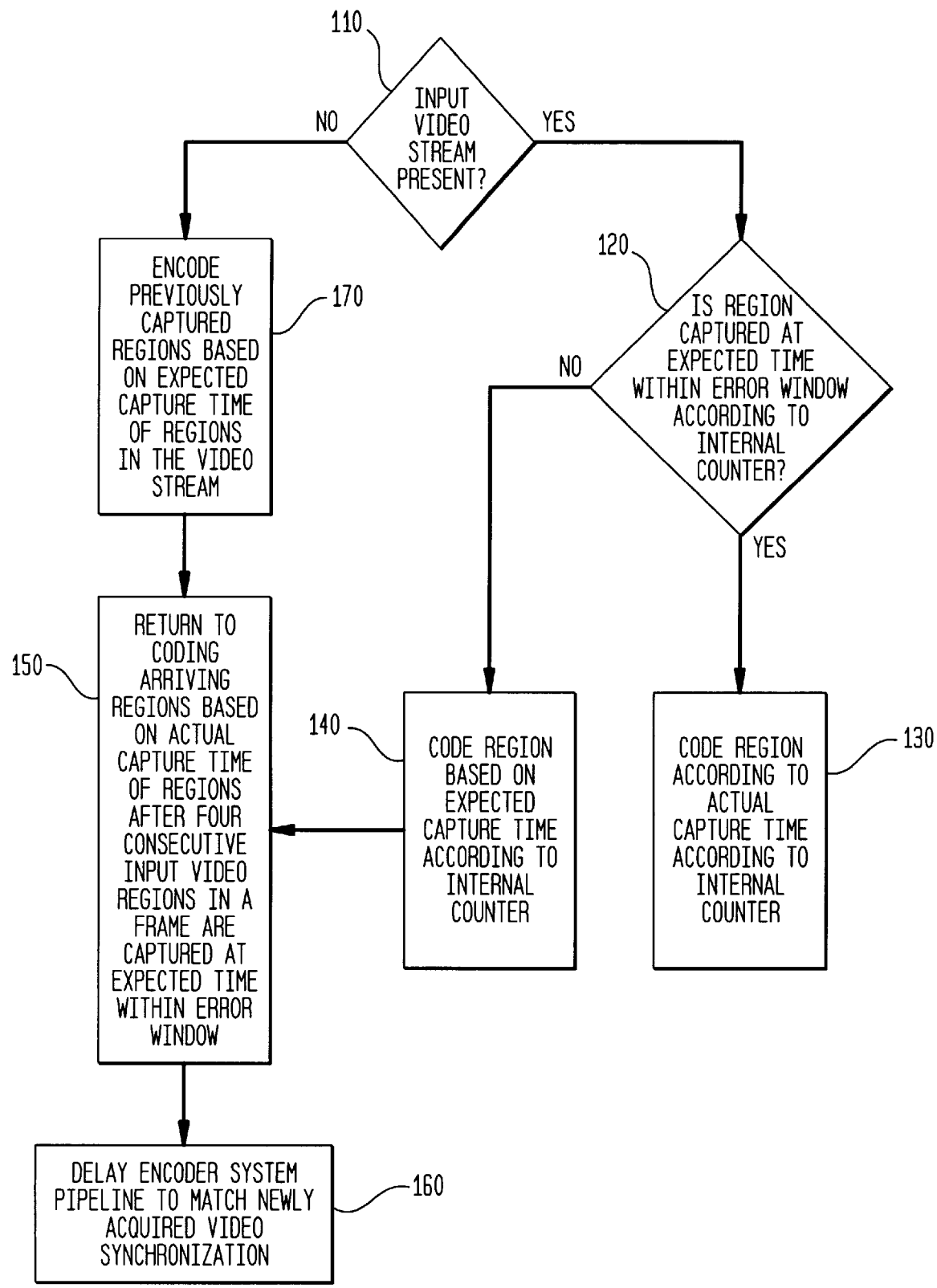
FIG. 3 is a flow chart of a resynchronization algorithm carried out by the encoding system of FIG. 2 in accordance with an illustrative embodiment of the invention.

FIG. 3 is a flow chart of the synchronization algorithm utilized by the encoder system 10 to regain synchronization if synchronization with the input video stream is lost. If the input video stream is present (step 110 of FIG. 3), it is then determined by the comparator if a region to be encoded is captured at its expected time with a predetermined error window (step 120). If so, the region is encoded by the encoding system based on the actual time of capture (step 130). If the region is not captured at the expected time (loss of synchronization) within a predetermined error window as indicated by the comparator, coding is based on the expected capture time according to the internal counter (rather than the actual capture time) (Step 140).

Figure 1:
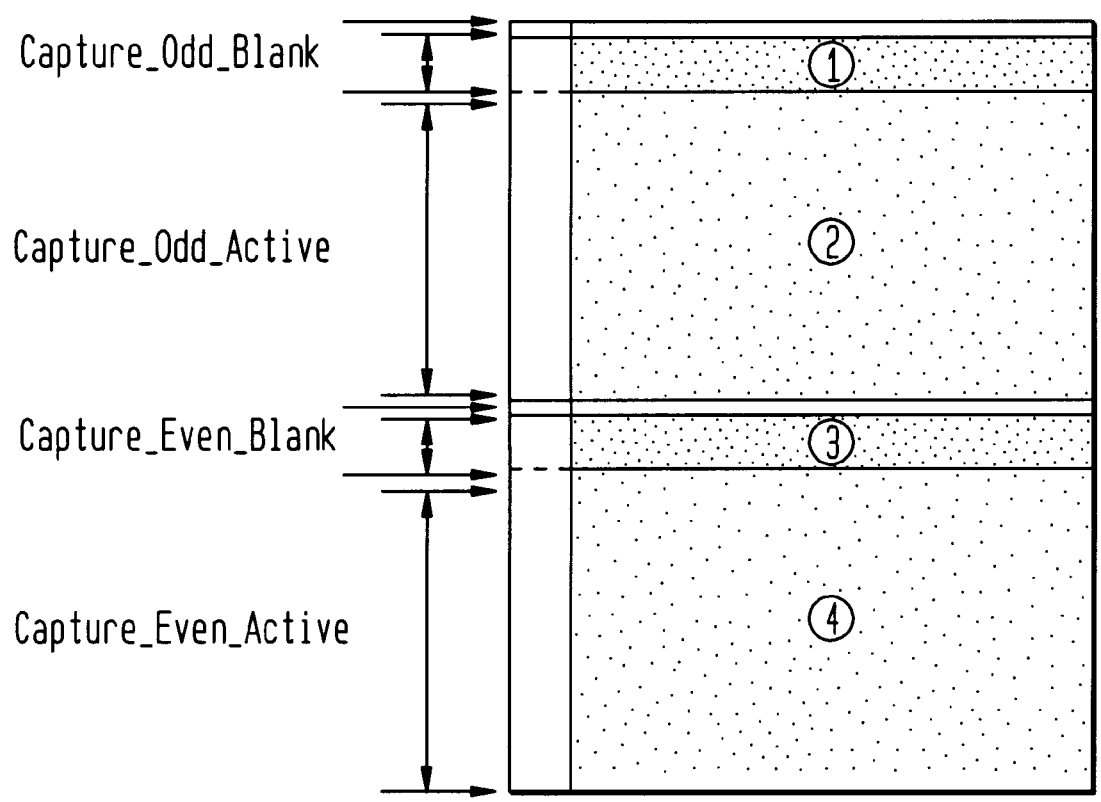
FIG. 1 schematically illustrates the format of a digital video signal which may be input into a digital video encoding system.

The encoder system returns to coding arriving video input stream regions based on actual capture time after four consecutive input video regions, in the order of 1, 2, 3, 4, as depicted in FIG. 1, are actually captured at their expected time within a window of error (Step 150). The encoder system pipeline is then delayed to match the newly acquired video synchronization (Step 160).

Another case where synchronization is lost is if the video stream is disrupted so that it is not present. In this case, the video encoder system maintains its function by encoding previously captured regions of the input stream now stored in internal memory based on expected capture time of regions in the now disrupted video stream (Step 170). Resynchronization is achieved as described above in accordance with Steps 150 and 160.

Figure 4:
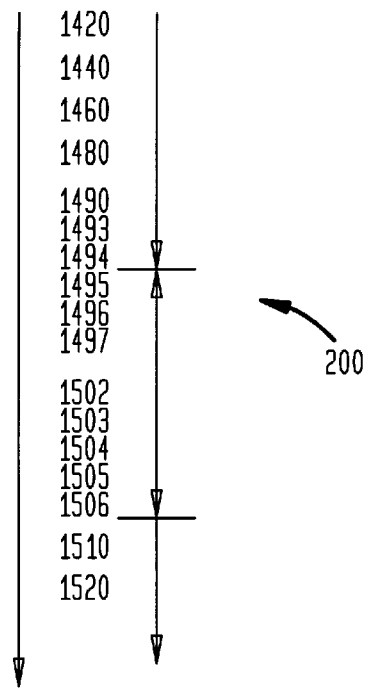
FIG. 4 schematically illustrates a sequence of internal counter (PTS) values and an error window.

FIG. 4 shows a sequence of PTS values which are put out by the internal counter 25. The numeral 200 designates an error window. If a signal for the end of an active region (i.e., an active field) does not come within the error window, there is a loss of synchronization. If the signal for the end of the active region is within the error window, there is synchronization. In this case, the expected PTS for the next region to be captured is determined from the PTS of the region just captured.

Figure 5:
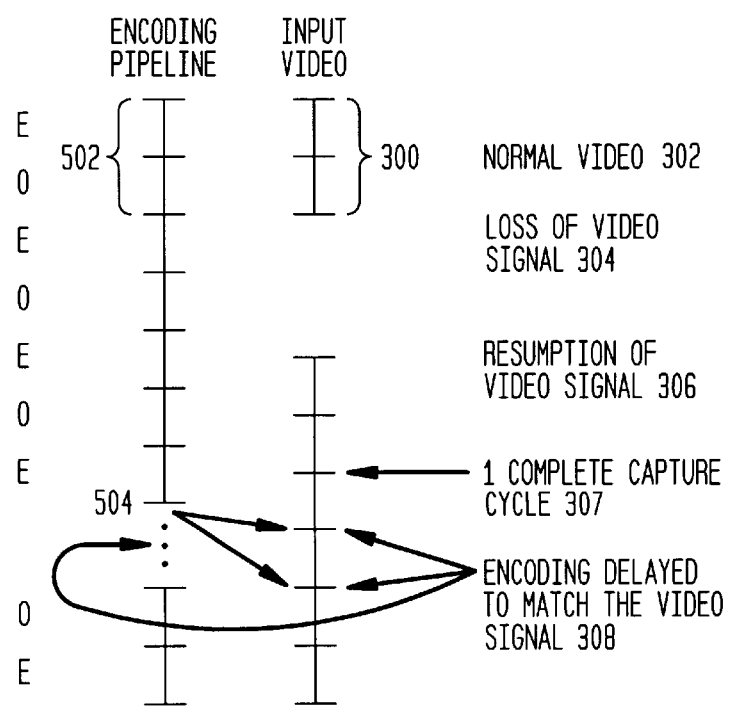
FIG. 5 schematically illustrates resynchronization of the incoming video signal and the encoder system according to the present invention.

FIG. 5 illustrates the resynchronization process according to the invention. In FIG. 5, the input video stream is designated 300. It comprises a sequence of even and odd fields designated E and O. As shown in FIG. 5, a period of normal video 302 is followed by a period in which there is a loss of video signal 304. The video input stream is resumed at time 306. At time 307, the frame has been captured. At time 308, four consecutive regions of a frame have been captured at their expected times within an error window.

In FIG. 5, the operation of the encoding system pipeline is designated by 500. The movement of consecutive even and odd fields through the encoding pipeline is schematically illustrated. At time interval 502, the encoding pipeline system is synchronized with the video input stream. After interval 502, this synchronization is lost. At time interval 504, the encoding pipeline is delayed to match the resumed video input stream at 308 to regain synchronization.

Finally, the above-described embodiments of the invention are intended to be illustrative only. Numerous alternative embodiments may be devised by those skilled in the art without departing from the spirit and scope of the following claims.

We claim:

1. A method for resynchronizing a video encoder system which receives an input video stream to be encoded, said video stream comprising successive alternating blanking and active regions, said method comprising the steps of:
   (1) maintaining an internal counter in said encoder system,
   (2) capturing said successive regions of said stream in said encoder system,
   (3) for at least one of said active regions, determining if said capture of said active region takes place at an expected time according to said internal counter, within a predetermined error window,
   (4) if said capture is within said predetermined error window, encoding said one region by said encoding system according to an actual timing of said capture according to said internal counter,
   (5) if said capture is outside said predetermined error window, encoding said region by said encoding system according to an expected time of said capture according to said internal counter.

2. The method of claim 1 further comprising the step of:
   if said incoming video stream is unavailable, using said encoding system to encode an active region previously captured in said encoding system in accordance with an expected timing of said video signal according to said internal counter.

3. The method of claim 2 further comprising the step of:
   if said capture is outside said predetermined error window or if said video stream is unavailable, resuming coding regions of said video stream based on actual time of capture of said regions according to said internal counter after the capture in said encoding system of a predetermined number of said regions is completed at their expected times.

4. The method of claim 3 wherein said predetermined number of said region is four consecutive regions in a frame.

5. A method for resynchronizing a video encoder system which receives an input video stream, said input video stream comprising alternating blanking and active regions, said method comprising the step of:
   if synchronization of said encoding system and said video stream is lost, encoding active regions of said video stream captured in said video encoder system based on expected timing of the capture of said regions of said stream in said encoder system according to an internal counter of said encoding system, until said encoding system detects the actual capture of a predetermined number of regions of said input video stream at an expected time according to said internal counter, within a predetermined error window, in which case a succeeding region of said input video stream is encoded based in its actual capture time according to said internal counter.

6. The method of claim 5 wherein synchronization is lost because said input video stream is unavailable.

7. The method of claim 5 wherein synchronization is lost because capture of one or more regions of said video stream takes place outside a window of error according to said internal counter.

8. A method for resynchronizing a video encoder system which receives an input video stream, said input video stream comprising alternating blanking and active regions, said method comprising the steps of:
   (a) maintaining an internal counter in said encoding system,
   (b) if said input video stream is present, detecting if one region of said video stream is captured in said encoding system at an expected time within a window of error according to said internal counter.
      (i) if said one region is captured within said window of error, coding said region in said encoding system according to the actual capture time of said one region according to said internal counter,
      (ii) if said one region is captured outside of said window of error, coding said previously captured region in said encoding system according to the expected capture time of said one region according to said internal counter, and
      (iii) return to coding succeeding regions of said input video stream based on actual capture time after a predetermined number of said succeeding regions have actually been captured at their expected times within a window of error
   (c) if the input video stream is lost, encoding previously captured regions of said input video stream based on expected capture times of regions in said video stream and when said video input stream is resumed, return to coding regions of said stream based on actual capture time after a predetermined number of successive regions are captured at their expected times within a window of error.

* * * * *